United States Patent [19]

Diaz et al.

[11] Patent Number: 5,753,752
[45] Date of Patent: May 19, 1998

[54] MELT-PROCESSED BLENDS CONTAINING POLY(VINYL ALCOHOL)

[75] Inventors: Thierry Christian Claude Diaz, Roquefort les Pins; Jean-Philippe Gaetan Meyer, Grasse le Plan, both of France; Carlos Alfonso Cruz, Holland, Pa.

[73] Assignee: Rohm and Haas Company, Philadelphia, Pa.

[21] Appl. No.: 798,416

[22] Filed: Feb. 7, 1997

[51] Int. Cl.$^6$ ............................................. C08F 16/06
[52] U.S. Cl. ............................................. 525/57; 525/56
[58] Field of Search ............................................. 525/56, 57

[56] References Cited

U.S. PATENT DOCUMENTS

| | | |
|---|---|---|
| 3,833,686 | 9/1974 | Grochowski et al. . |
| 4,086,296 | 4/1978 | Carty et al. . |
| 5,147,930 | 9/1992 | LaFleur et al. . |
| 5,189,097 | 2/1993 | LaFleur et al. . |
| 5,194,498 | 3/1993 | Stevenson et al. .................. 525/81 |
| 5,208,083 | 5/1993 | Freed . |
| 5,296,537 | 3/1994 | LaFleur et al. . |
| 5,322,892 | 6/1994 | LaFleur et al. . |
| 5,362,801 | 11/1994 | Amici et al. . |
| 5,362,802 | 11/1994 | Amici et al. . |
| 5,362,803 | 11/1994 | LaFleur et al. . |
| 5,378,758 | 1/1995 | Amici et al. . |
| 5,378,759 | 1/1995 | Amici et al. . |
| 5,389,724 | 2/1995 | LaFleur et al. . |
| 5,545,689 | 8/1996 | Amici et al. . |
| 5,605,960 | 2/1997 | Brady et al. .................. 525/57 |

FOREIGN PATENT DOCUMENTS

| | | |
|---|---|---|
| 0 477 765 A | 4/1992 | European Pat. Off. . |
| 0 708 144 A | 4/1996 | European Pat. Off. . |

OTHER PUBLICATIONS

Patent Abstracts of Japan, vol. 009, No. 211 (C–300), 29 Aug. 1985 & JP 60 077976 A (Denki Kagaku Kogyo KK), 2 May 1985 & Chemical Abstrancts, vol. 103, No. 24, Dec. 16, 1985.

*Primary Examiner*—Melvyn I. Marquis
*Assistant Examiner*—D. Aylward
*Attorney, Agent, or Firm*—Ronald S. Hermenau; Darryl P. Frickey

[57] ABSTRACT

Polymers containing a high percentage of vinyl alcohol units are difficult to process into sheet, film, injection-molded objects, or fibers. Such melt-processing is greatly enhanced by admixing certain core/shell copolymers having a rubbery, preferably crosslinked core mainly of units derived from butadiene, and an outer shell mainly of a copolymer of styrene and acrylonitrile. Such copolymers do not require the presence of functional groups capable of reaction with the hydroxyl groups of the poly(vinyl alcohol).

5 Claims, No Drawings

MELT-PROCESSED BLENDS CONTAINING POLY(VINYL ALCOHOL)

This invention relates to melt-processed blends of polymers containing a high percentage of vinyl alcohol units blended with certain non-functionalized, non-reactive core/shell copolymers. It further relates to melt-processed blends of these polymers in the form of sheet, film, injection-molded objects, fibers and other formed objects.

Of all the synthetic polymers considered as materials with useful gas permeation properties, such as resistance to passage of oxygen, carbon dioxide, water, and the like, poly(vinyl alcohol) (PVOH), a polymer made up of units of the structure

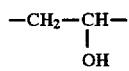

and generally prepared by the total hydrolysis of homopolymers of vinyl acetate or related vinyl esters, the starting polymer made up of units of the structure

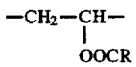

where R is alkyl, that is, from one to eight carbon atoms, preferably methyl, ranks as the most impervious to the passage of small molecules. PVOH exhibits this property because of the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded.

The above limitations were surmounted to some degree by use of functionalized polymeric additives containing carboxylic acid or anhydride groups, but these approaches have the concomitant effects of being somewhat dependent on processing conditions to achieve reaction between the various functionalized groups. These approaches, described in U.S. Pat. Nos. 5,189,097 and 5,378,758, do teach in general that unspecified commercial impact modifiers may be present in the blends, but do not specifically teach the efficacy of unfunctionalized impact modifiers absent the functionalized additives.

U.S. patent application 08/412,434 (first filed as French Application 94-12553 on Oct. 20, 1994) discloses certain core/shell impact modifiers, based on polymers of butadiene or of alkyl acrylates as the core and polymers of methyl methacrylate as the shell and without any reactive functionality such as acid or anhydride groups, are effective additives for the melt-processing of poly(vinyl alcohol). However, these additives may be somewhat more expensive than other non-functionalized core/shell impact modifiers or non-functionalized single stage copolymers.

Thus there still exists a need for a less expensive means to allow melt-processing of polymers of high vinyl alcohol content, such as fully hydrolyzed or highly hydrolyzed polymers of vinyl esters, into useful objects maintaining most of the barrier properties of the polymer of high vinyl alcohol content. There further exists a need for additive polymers which may be blended with polymers of high vinyl alcohol content to enhance their ability to form films and coatings with improved properties of the film or coating without much loss in barrier properties.

We have discovered a means for meeting these needs by melt-blending the poly(vinyl alcohol) with certain core/shell polymers based on styrene/acrylonitrile shells, which do not contain acid functionality (or other functionality which can react with the poly(vinyl alcohol)) and further which do not contain expensive copolymerizable amide monomers. The discovery offers an alternate and less costly means for achieving a toughened melt-processed blend based on poly(vinyl alcohol). Thus, we have discovered a melt-processed blend comprising:

a) from 80 to 98 parts, based on 100 parts of the blend, of at least one first polymer containing at least 88 mol % of units of the structure

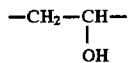

and optionally units selected from one or more of the following structures:

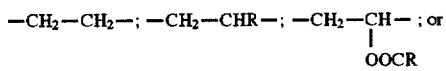

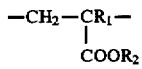

wherein R is methyl, $R_1$ is H or $CH_3$, and $R_2$ is an alkyleneoxy group;

and b) from 2 to 20 parts, based on 100 parts of the blend, of a copolymer prepared by free-radical polymerization of a mixture comprising from 65 to 85 mol percent of a vinyl aromatic monomer, preferably styrene and 15 to 35 mol percent acrylonitrile or methacrylonitrile; wherein the polymerizable mixture contains no functional monomer capable of reaction with the hydroxyl groups of the first polymer, and further contains no copolymerizable monomer containing amide or cyclic amide groups.

We further have discovered that the above melt-processed blend may comprise from 2 to 20 parts, based on 100 parts of the blend, of a second polymer wherein at least part of the second polymer is the shell of a core/shell polymer, which core/shell copolymer comprises:

a) from 30 to 80 parts, based on 100 parts of the core/shell polymer, of a rubbery, crosslinked core polymer formed by the polymerization of:
  (i) at least 75 parts, based on 100 parts of core polymer, of butadiene;
  (ii) up to 25 parts, based on 100 parts of core polymer, of an alkyl acrylate or alkyl methacrylate, wherein the alkyl group contains from one to eight carbon atoms, styrene, or acrylonitrile;
  (iii) optionally up to 5 parts, based on 100 parts of core polymer, of at least one polyunsaturated monomer other than butadiene;

b) from 20 to 70 parts, based on 100 parts of the core/shell polymer, of a final shell comprising a copolymer prepared by free-radical polymerization of a mixture comprising from 65 to 85 mol percent of a vinyl aromatic monomer, preferably styrene, and 15 to 35 mol percent acrylonitrile or methacrylonitrile; wherein the polymerizable mixture contains no functional monomer capable of reaction with the hydroxyl groups of the first polymer, and further contains no copolymerizable monomer containing amide or cyclic amide groups.

Preferably the first polymer contains at least 88 mol % units of the "vinyl alcohol" structure, and more preferably the first polymer contains at least 95 mol % units of the "vinyl alcohol" structure, i.e.,

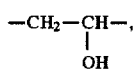

and most preferably contains 98% or more of such units. The optional units in the vinyl alcohol copolymers are preferably those derived from ethylene or vinyl acetate. It is separately preferred that the viscosity of a 4% aqueous solution of the first polymer is at least 4 mPa s, for the melt-processed blend to have attractive thermoplastic properties.

The first polymer preferably should exhibit a low content of acetate ions, such as sodium acetate. The sodium content (or general salt content) may be measured with a Varian AA 300 Atomic Absorption Spectrometer or a similar device. The content may be low as received from the supplier, or it may be decreased by washing the first polymer, or the acetate content may be lowered by treatment with phosphoric acid, as in U.S. Pat. No. 3,425,979, which converts the acetate to acetic acid, which is vented during the melt processing. A value below 0.88% is preferred.

It will be recognized that the second copolymer includes the styrene/acrylonitrile copolymers which are well-known thermoplastics, and further the core/shell polymers include the acrylonitrile/butadiene/styrene (ABS) polymers, which are well-known as thermoplastics and also as impact modifying additives for polymers such as poly(vinyl chloride). However, their utility in aiding the melt-processing of poly(vinyl alcohol) is novel.

In the core/shell modifier, the rubbery, crosslinked core preferably contains at least 75 weight percent, preferably at least 95 weight percent, of units derived from butadiene, that is, incorporated by free-radical polymerization of butadiene. Units derived from alkyl (meth)acrylates, styrene, or acrylonitrile are preferably at levels of 5 weight percent or less. It is generally preferred to have present one or more polyunsaturated monomers other than butadiene, and the preferred amount is from 0.5 to 2 weight percent. The polyunsaturated monomers may contain two or more sites of unsaturation of equivalent reactivity, as illustrated by ethylene glycol dimethacrylate, trimethylolpropane triacrylate, divinylbenzene, and the like, or may contain two or more sites of unequal reactivity, as illustrated by allyl methacrylate, diallyl maleate, and the like. Both types of polyunsaturated monomers may be present.

It is not necessary that one or more intermediate shells be present, but such may be present, such as intermediate shells formed from, e.g., styrene and acrylonitrile, or styrene/methyl methacrylate, and acrylonitrile. For isolation of most core/shell polymers in powdery form, it is usually needed to have at least 20 weight percent of the shell present in the core/shell polymer.

If addition of a low level of plasticizer, such as glycerine, is desired, pre-compounding of the powders by such means as Henschel mixing or a Banbury mixer, is desirable to obtain complete mixing. Although glycerine may lower the glass temperature of the final blend, it can aid in obtaining better admixture of the two components, so as to avoid presence of gel or requirement of extensive melt-mixing.

As noted, the core or shell(s) of the core/shell modifier useful in the present invention do not contain units derived from a copolymerizable monomer containing amide or cyclic amide functionality, so that the modifier does not contain, e.g., units derived from vinyl pyrrolidone, (meth) acrylamide, N-vinyl acetamide, and the like. Further, the core/shell modifier does not contain reactive functionality, that is, does not contain units derived from a functional monomer capable of reaction with the hydroxyl groups of the first polymer, such as glycidyl methacrylate, methacrylic acid, acrylic acid, maleic anhydride, and the like.

Blending of the two polymers may be carried out most conveniently by dry mixing the finely granulated polymer particles prior to melt compounding in a single- or twin-screw extruder. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents, coloring agents, fillers and other compounds. Further, fugitive plasticizers, such as water in amounts about 3%, may be added to aid in compounding and processing the blend.

The blend containing the core/shell polymer additive may further be prepared by admixing the additive polymer in emulsion form, when an emulsion polymerization is a feasible way to prepare the additive polymer, with the poly (vinyl alcohol) in solid form, and then processing directly with water removal such as by extrusion in a vented extruder, or by drying the powder blend under vacuum, and then blending with the matrix polymer.

The blends of the present invention may be considered as a polymer containing vinyl alcohol units modified with a processing aid, since the core/shell polymer additive (or the shell polymer alone as additive) enables the poly(vinyl alcohol) to be melt-processed with a reduced tendency towards thermal decomposition, and aids in the formation of melt-processable objects or melt-processable intermediates, such as pellets.

All of the above melt-processed blends are useful in many applications. When the vinyl alcohol polymer is water-soluble, a film from the blends can be broken down in water for ready disposal. Such blends in film form may also be useful as containers for toxic, corrosive, or skin-sensitizing chemicals which are to be used in water, such as agricultural chemicals to be sprayed. The blends in film form such as in blown film, are useful as high gas barrier films for packaging, especially of food. The films from the blends can be laminated onto substrates to form useful barrier structures for containment or packaging of food or beverages. The blends in container form, such as film, bottles, and the like may be used to exclude gases such as oxygen or to contain gases such as carbon dioxide. Blends with improved heat distortion properties may be useful in hot fill packaging or in retortable or sterilizable container packaging. The blends or laminates may also be useful in museum and other glazing where clarity and long-term retention of an inert atmosphere are desired. The blends may also be useful in bags for medical laundry, and for lamination of films to paper. The blends of the present invention may be used to form useful fibers. The blends may be processed from the melt or from a solvent-swollen gel. The melt-processable blends may be passed through an appropriate die to form filaments which may be stranded into single or multi-stranded fibers of various thicknesses. The fibers may then be further processed into appropriate products, such as packaging materials, water-soluble disposable cloths, such as diapers, and the like. The fibers may be post-treated after forming by chemicals which will insolubilize the poly(vinyl alcohol), and the resulting fibers may be processed into articles with high moisture uptake which do not dissolve in water. Further, the polymers may be spun by a solid state process wherein the fiber is oriented in the solid state to produce a fiber with a very high tensile modulus.

Films from the present blends may be laminated, co-extruded, or co-injection molded to form laminated structures with a good combination of clarity, toughness, and barrier properties. For example, a blend may be co-extruded with poly(ethylene terephthalate) (PET), with poly(methyl methacrylate), with poly(vinyl chloride), or with polycarbonate, to form continuous laminated film with good adhesion between the layers. The co-extruded film with PET can be thermoformed into useful objects without delamination. Multi-layer laminates may also be formed.

The blends may also be injection-molded into useful objects. It should be noted that at additive levels below 6 parts, any external lubricant, such as polyethylene wax, should be avoided or used at lower levels than those shown for mill-mixed or calendered formulations, so that adequate fusion will be obtained in the extruder compounding prior to injection molding.

The blends are also suitable for calendering, profile extrusion, foam extrusion, and extrusion blow molding into useful articles, either in film or as thicker articles.

EXAMPLES

General:

The following poly (vinyl alcohol) is used in the study. Viscosity measurements are by DIN 1342 using a capillary viscometer DIN 52562 and DIN 53012.

| Trade Name | Designation | Supplier | % PVOH | Visc., 4% mPa s | MP, °C. |
|---|---|---|---|---|---|
| Mowiol | 010-98 | Hoechst | 98 | 7.7 | 226 |

Additive C: An injection molding grade ABS, known as Lustran 440, further containing tetrakis(methylene(3,5-di-t-butyl-4-hydroxyhydrocinnamate)) methane 0.4 weight % on ABS.

Additive D: A core/shell (70//30)polymer of a butadiene/ styrene 95/5 rubber (with 1% divinylbenzene)//methyl methacrylate/butyl acrylate/methacrylic acid (60/30/10); stabilized with a combination of hindered phenol antioxidants as taught in U.S. Pat. No. 5,164,434. This additive is not within the present invention. It is taught in U.S. Pat. No. 5,451,635, and in allowed U.S. application 08/232,892.

Additive E: A commercial grade of styrene/acrylonitrile copolymer, with an acrylonitgrile content of 31 weight %.

Wax F: polyethylene wax

Test Procedures: The formulations are milled on a two-roll mill to observe fusion, dispersion, color and sticking. After removal of the processed sheet, samples are compression molded to compare color and degree of fusion. Direct milling of dry blends of PVOH and the additives was employed. Conditions were: 100 grams PVOH, 2.0 grams additive, 0.5 grams Wax F: milled 2 minutes with front roller at 235° C., rear roller 225° C. Front roller speed 26 rpm; roller clearance 0.2 mm.; friction (ratio of front mill/rear mill speed) 1.3. Some materials satisfactory at roller clearance 0.2 mm. were further checked for ease of processing with a wider gap (0.5 mm.) Samples of the removed film (if fusion occurred) were compression molded at 250 kPa/cm² at 235° C., then 2 minutes with no heat.

EXAMPLES 1–5

This Example demonstrates the ability of the ABS or SAN to process PVOH versus the poor behavior of unmodified PVOH and the excellent behavior of Additive D, previously shown to cause melt fusion.

| Formulation | Ex. 1 Additive A | Ex. 2 Additive B | Ex. 3 Additive C | Ex. 4 Additive D CONTROL | EX. 5 Additive E (SAN) | Ex. 6 PVOH CONTROL |
|---|---|---|---|---|---|---|
| Fusion | GOOD | MODERATE | MODERATE | GOOD | FAIR | POOR |
| Color | BLACK pigment | GOOD pigment | GOOD pigment | GOOD | SLIGHTLY DARK | DARK |
| Homogeneity | EXCEL. | MODERATE | MODERATE | EXCEL. | GOOD | POOR |
| Over-All Rating | VERY GOOD | MODERATE/ GOOD | MODERATE/ GOOD | VERY GOOD | MODERATE | POOR |

The following additives are used in the study:

Additive A: An extrusion grade ABS, known as Novodur P2MT supplied by Bayer. It contains a black pigment. The rubber content is not known. The particle size of the rubber is 0.15 to 0.4 micron. The acrylonitrile content is between 28 and 30 weight percent. There is also an unknown content of x-methylstyrene in the shell or blended hard polymer.

Additive B: An injection molding grade ABS, known as Lustran 440. Acrylonitrile content of the styrene/ acrylonitrile hard stage is ca. 31%; the rubber content is not known. The rubber is a combination of an emulsion-prepared rubber of particle size 0.2 micron and a suspension-prpeard rubber of particle size 1 micron.

We claim:
1. A melt-processed blend comprising:
(a) from 80 to 98 parts, based on 100 parts of the blend, of at least one first polymer containing at least 88 mol % of units of the structure

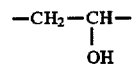

and
(b) from 2 to 20 parts, based on 100 parts of the blend, of a copolymer prepared by free-radical polymerization of a mixture comprising from 65 to 85 mol percent of a vinyl aromatic monomer and 15 to 35 mol percent acrylonitrile or methacrylonitrile; wherein the polymerizable mixture contains no functional monomer capable of reaction with the hydroxyl groups of the first polymer, and further contains no copolymerizable monomer containing amide or cyclic amide groups.

2. The melt-processed blend of claim 1 wherein at least part of the second polymer is the shell of a core/shell polymer, which core/shell copolymer comprises (a) from 30 to 80 parts, based on 100 parts of the core/shell polymer, of a rubbery, crosslinked core polymer formed by the polymerization of:

(i) at least 75 parts, based on 100 parts of core polymer, of butadiene;

(ii) up to 25 parts, based on 100 parts of core polymer, of an alkyl acrylate or alkyl methacrylate, wherein the alkyl group contains from one to eight carbon atoms, styrene, or acrylonitrile;

(iii) optionally up to 5 parts, based on 100 parts of core polymer, of at least one polyunsaturated monomer other than butadiene;

(b) from 20 to 70 parts, based on 100 parts of the core/shell polymer, of a final shell comprising a copolymer prepared by free-radical polymerization of a mixture comprising from 65 to 85 mol percent of a vinyl aromatic monomer and 15 to 35 mol percent acrylonitrile or methacrylonitrile; wherein the polymerizable mixture which forms the core and the polymerizable mixture which forms the shell contain no functional monomer capable of reaction with the hydroxyl groups of the first polymer, and further contain no copolymerizable monomer containing amide or cyclic amide groups.

3. The melt-processed blend of claims 1 or 2 wherein the vinyl aromatic monomer is styrene.

4. The melt-processed blend of claims 1 or 2 wherein the viscosity of a 4% aqueous solution of the first polymer is at least 4 mPa s.

5. The melt-processed blend of claims 1 or 2 wherein the acetate ion content of the first polymer is less than 0.88%.

* * * * *